Patented Oct. 1, 1935

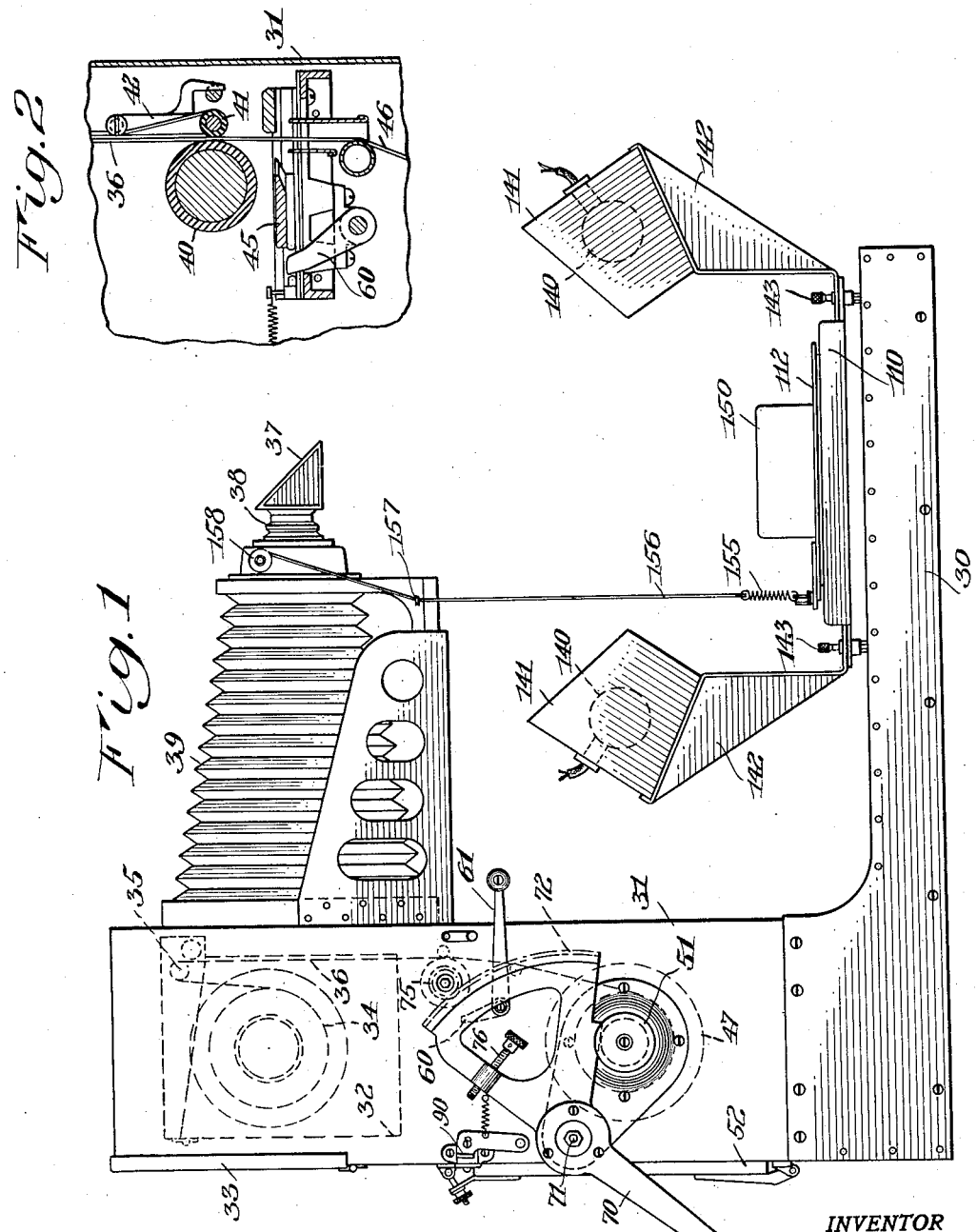

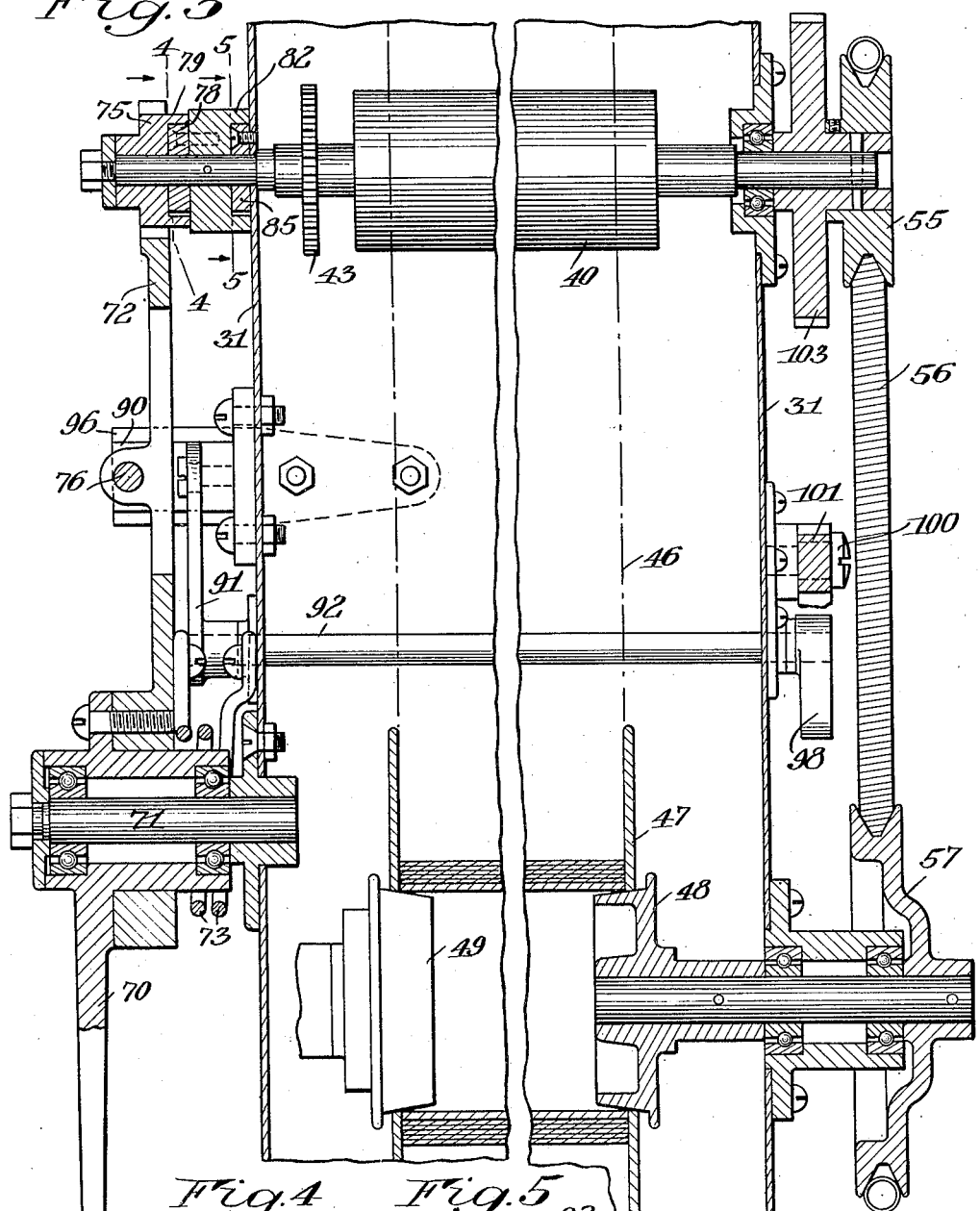

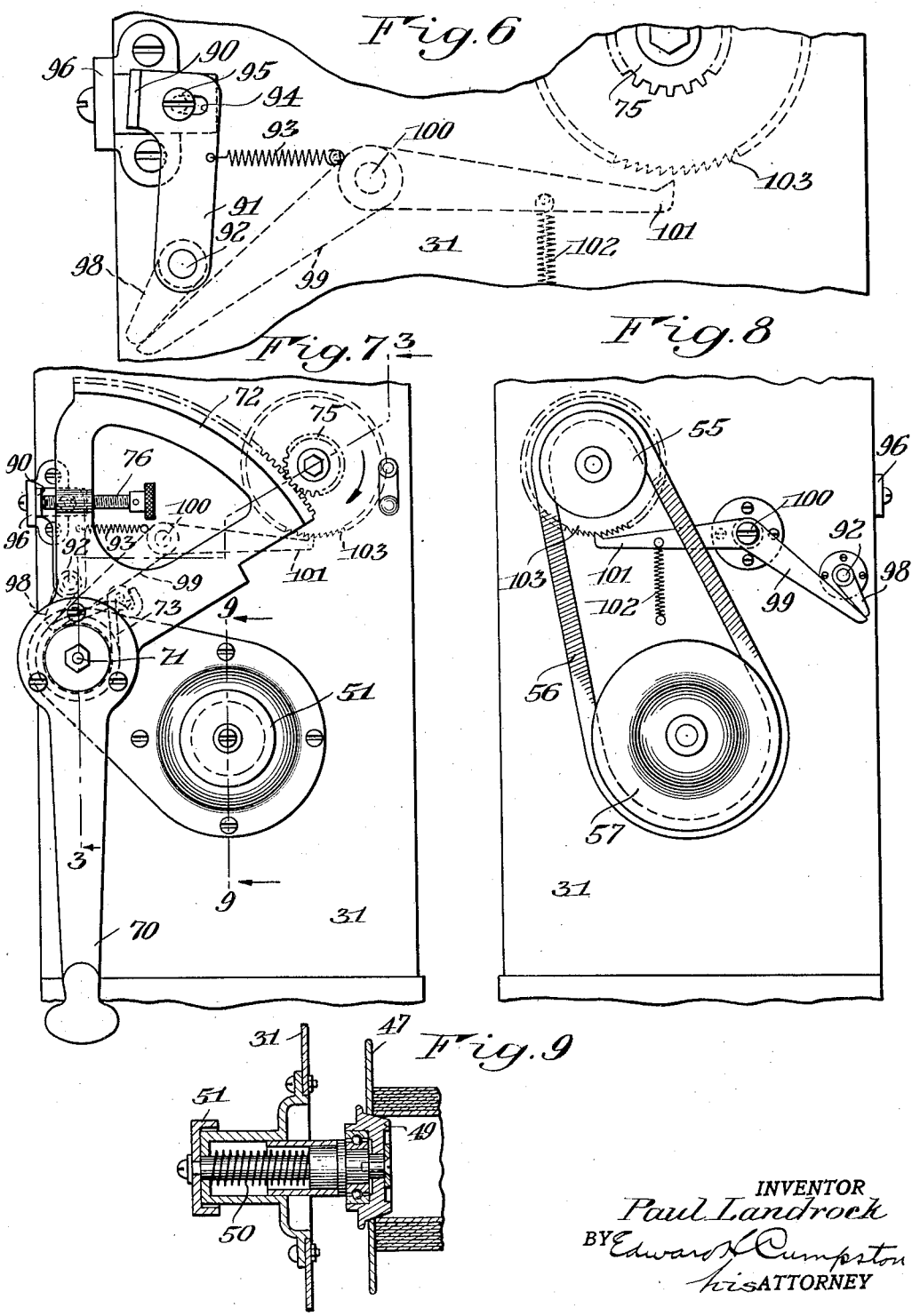

2,015,803

UNITED STATES PATENT OFFICE 2,015,803

PHOTOGRAPHIC COPYING MACHINE

Paul Landrock, Rochester, N. Y., assignor to Photostat Corporation, Providence, R. I., a corporation of Rhode Island Original application December 21, 1932, Serial No. 648,183. Divided and this application January 17, 1934, Serial No. 707,001

8 Claims. (Cl. 88—24)

This invention relates to a photographic copying machine.

An object of the invention is the provision of a simple and sturdy copying machine, of few parts, easy and comparatively inexpensive to construct, which is not liable to get out of order.

Another object is the provision of such a machine so designed and constructed that it may be operated satisfactorily and efficiently by a comparatively inexperienced operator.

Still another object is the provision, in such a machine, of improved mechanism for feeding the film or web of sensitized material through the proper amount after making an exposure.

A still further object is the provision of a photographic copying machine which, although simple and having few parts, is substantially foolproof in operation, and one in which the feeding of the sensitized material can be accomplished with the greatest facility by an inexperienced person.

To these and other ends the invention resides in certain improvements and combinations of parts, all as will be hereinafter more fully described, the novel features being pointed out in the claims at the end of the specification.

In the drawings:

Fig. 1 is a side elevation of a photographic copying machine constructed in accordance with a preferred embodiment of the invention;

Fig. 2 is a vertical sectional view taken substantially centrally through a portion of the camera illustrating the sheet feeding and severing mechanism;

Fig. 3 is a vertical section through the lower part of the camera body taken substantially on the line 3—3 of Fig. 7;

Fig. 4 is a vertical section through a clutch, taken substantially on the line 4—4 of Fig. 3;

Fig. 5 is a similar section through another clutch, taken substantially on the line 5—5 of Fig. 3;

Fig. 6 is a view of part of the mechanism used to prevent overrunning of the feed rollers;

Fig. 7 is a side elevation of a part of the camera, illustrating certain of the mechanism shown in Fig. 1, with the parts in a different position;

Fig. 8 is a view of a fragment of the opposite side of the camera from that shown in Figs. 1 and 7; and Fig. 9 is a vertical section taken substantially on the line 9—9 of Fig. 7.

The same reference numerals throughout the several views indicate the same parts.

This application is a division of my application for patent on Photographic copying machine, filed December 21, 1932, Serial No. 648,183.

The machine illustrated in the accompanying drawings and described in detail in this specification as the preferred embodiment of the invention, is a machine particularly adapted for the rapid photographic copying of various documents and papers, at a predetermined constant size ratio (preferably one to one). It comprises, in general, a base 30 having near its left hand end an upwardly extending casing or chamber 31 constituting the camera body, in the upper part of which is placed a roll box 32 accessible through a door 33. The roll box may carry a roll 34 of sensitized photographic material such as paper, for example. The strip of sensitized material is gradually unwound from the roll 34, passed over a suitable guide roller 35, and led thence downwardly through the focal plane of the camera as indicated at 36.

Light entering the camera through the prism 37 and suitable lenses within the lens casing 38 passes through the bellows 39 and to the focal plane, where the light falls upon the sheet material at 36 and causes an exposure of this sheet material.

After each exposure, the exposed portion of the sheet material is moved out of the focal plane to bring a fresh unexposed portion of the sheet material into the focal plane ready for the next exposure. This feeding may be accomplished, for example, by means of a feed roller 40 (Figs. 1, 2, and 3) engaging one side of the sheet material, while another roller 41 mounted on swinging arms 42 presses the sheet material against the feed roller 40. The two rollers 40 and 41 are preferably connected to each other to rotate together, by means of a gear 43 on the shaft of the roller 40 meshing with another gear on the shaft of the roller 41.

Rotation of the rollers 40 and 41 feeds the sheet material downwardly past a severing knife 45 and into the lower part of the casing 31, where the sheet material is indicated at 46 and where it is preferably rewound on a suitable winding spool or reel 47 held, for example, on the tapered driven trunnion 48 and the supporting trunnion 49 (Figs. 3 and 9) which supporting trunnion is normally held in proper effective position by the spring 50 and may be withdrawn longitudinally against the action of the spring by pulling on the external knob 51, to release the trunnion from the spool and permit the spool to be withdrawn from the machine through a door 52.

The trunnion 43 may be driven in any suitable manner to produce the desired rotation of the spool 47 for rewinding purposes. For example, a pulley 55 may be mounted on the shaft of the feed roller 40 and connected by means of a coiled spring belt 56 to a pulley 57 on the shaft of the trunnion 48, so that rotation of the feed roller 40 causes rotation of the rewinding trunnion 48, but the coiled spring belt 56 may slip over the pulleys in known manner so that the sheet material is always kept reasonably tightly wound on the spool without being broken by too great a tension on it.

In many instances, the entire roll of sheet material from the roll 34 will be exposed and rewound on the spool 47 before the spool is removed from the machine to be developed and fixed. In other instances, however, it may be desired to develop part of a strip of sheet material without waiting for the entire strip to be exposed. This may be accomplished by cutting the strip at the proper point by means of the previously mentioned knife 45 (Fig. 2) which may be actuated by means of an arm 60 (Figs. 1 and 2) engaging the knife to reciprocate it, which arm is preferably directly connected to and operated by the external operating lever or arm 61 (Fig. 1).

The feed rollers 40 and 41 may be actuated in any suitable manner. It is an object of the present invention, however, to provide a machine which is substantially foolproof and which may be operated satisfactorily by a person having substantially no previous experience with machines of this kind. To this end, novel and improved mechanism of simplified construction is provided for operating the feed rolls.

Heretofore, it has been customary in machines of this same general character to operate the feed rolls by means of a crank which has usually had to be turned repeatedly through a number of revolutions in order to produce the proper amount of feeding for each exposure. This has required the operators to have some experience, at least to the extent of knowing how many revolutions should be imparted to the crank at each feeding operation, or else it has been necessary to provide a stop device for stopping the crank at the end of the proper number of revolutions, with the attendant necessity of instructing the operator in the function and use of such a stop device.

In the simplified and foolproof construction according to the present invention, however, a lever or arm is provided which, upon a single oscillation through materially less than one complete revolution, is effective to produce the desired amount of feeding of the sensitized sheet material. Thus, it is not necessary for an operator to be trained to turn a crank through a certain number of revolutions, or to understand the use of a stop device. All that it is necessary for him to do, when using the simplified machine of the present invention, is to grasp the feeding arm or lever and give it one pull as far as it will go, this being sufficient to produce the desired feeding.

The feeding lever is indicated at 70 in Figs. 1, 3, and 7, and is mounted for oscillation about an axis 71. A gear segment 72 is directly connected to the arm 70 to move therewith. This gear segment, as plainly shown in the drawings, extends through only a small part of a complete circle.

A spring 73 coiled around a hub on the arm 70 tends to hold this arm in its extreme clockwise position, in which an edge of the gear segment 72 abuts against a suitable stop on the side of the casing 31, such as the housing cooperating with the trunnion 49.

A pinion 75 mounted on the shaft of the feed roller 40 meshes with the gear teeth on the gear segment 72. The radius of the pinion is materially less than the radius of the gear segment, so that a single oscillation of the gear segment through a minor part of a single revolution will cause the necessary plurality of revolutions of the feed roller 40 to feed the sheet material through the required distance. The relative proportions of the radii of the pinion and of the gear segment may be varied as circumstances may require, but in practice it is found to be satisfactory to have the radius of the gear 72 approximately ten times the radius of the pinion 75.

To produce a feeding operation, the arm 70 is grasped when it is in its initial or normal position, illustrated in Fig. 1, in which it is held by the spring 73. The lower end of the arm 70 is then pulled rightwardly so as to rotate the gear segment in a counterclockwise direction, the pulling being continued to the extreme limit of the motion of the parts; that is, until an adjustable abutment screw 76 on the gear segment comes into contact with a suitable abutment on the casing. This single pull of the operating arm 70 produces a predetermined plurality of clockwise revolutions of the pinion 75 and of the feeding roller 40, thus feeding the sheet material accurately through exactly the predetermined amount necessary to remove the exposed portion of sheet material from the focal plane and to bring a fresh unexposed portion into the focal plane.

When the single pull on the operating member 70 has been completed, to the position shown in Fig. 7, the operator lets go of the arm 70 and the spring 73 causes it to move back from the position shown in Fig. 7 to its initial or normal position shown in Fig. 1. During this return movement of the parts, the pinion 75 has a corresponding return movement in a counterclockwise direction, but this does not affect the feed roller 40 because of the clutch arrangement now to be described with reference to Figs. 3, 4, and 5.

The pinion 75 is not directly connected to the shaft of the feed roller 40 but is free to rotate thereon. A clutch block 78 is fixed to the shaft between the pinion 75 and the wall of the casing 31. The pinion 75 is provided with an annular flange 79 cooperating with rollers or balls 80 pressed by springs 81 toward the small ends of tapered recesses in the block 78. These parts constitute a one-way clutch operating in a manner well understood in the art, whereby clockwise rotation of the pinion 75 and annular flange 79 is effective to cause corresponding clockwise rotation of the block 78 and the roller shaft on which it is mounted. Counterclockwise rotation of the pinion 75, however, causes no corresponding movement of the block 78 or the feed roller.

A similar one-way clutch, but effective in an opposite direction, is interposed between the block 78 and the casing 31 so as to prevent any possibility of accidental retrograde or counterclockwise rotation of the feed roller while the pinion 75 is moving in a counterclockwise direction. Thus, as shown in Figs. 3 and 5, the block 78 has an annular flange 82 cooperating with balls or rollers 83 similarly pressed by springs toward the small ends of tapered recesses which extend in an opposite direction from the recesses of the clutch shown in Fig. 4, these tapered recesses being formed in a block 85 fixed to the casing 31. These parts constitute a one-way clutch permitting the block 78 and the feed roller shaft to turn freely in a clockwise direction but preventing any retrograde or counterclockwise rotation.

By this arrangement, the movements of the feeding lever 70 are transferred to the feed roller 40 only when the lever is moved rightwardly or in a counterclockwise direction. When the lever 70 is released at the end of the stroke and is allowed to return to initial position under the influence of the spring 73, the pinion 75 rotates idly on the feed roller shaft and the feed roller is held against reverse rotation by means of the clutch illustrated in Fig. 5.

Because of the comparatively great step-up ratio of the gearing between the lever 70 and the feed roller 40, it is obvious that the feed roller will move much faster than the rate of angular movement of the lever 70. If an operator moves the lever 70 comparatively rapidly while making a feeding operation, the feed rollers 40 and 41 may attain a considerable velocity and the inertia of the parts might be so great that rotation of the rollers might continue to some extent even after the lever 70 had reached the limit of its movement. Such additional or excess rotation of the feeding rollers would be undesirable, not only from the standpoint of waste of sensitized material, but also because it would be more difficult to cut the separate exposures apart after a long roll of exposed sensitized material had been developed. Consequently, in furtherance of the object of making the machine simple and foolproof, the machine is preferably provided with stop mechanism which will prevent any such excess rotation or overthrow of the feed rollers, even if the feeding lever 70 is actuated rapidly or violently.

This is accomplished, in the present instance, by stop means actuated by the gear segment 72 when it reaches its predetermined limit of motion. The previously mentioned adjustable abutment screw 76 on the gear segment 72 is adapted as previously stated, to cooperate with an abutment on the casing 31. The abutment, in the present instance, is in the form of an ear or lug 90 (Figs. 1, 3, 6, and 7) on a lever 91 fixed to the shaft 92 which is capable of slight oscillation and which extends through the casing 31 from one side to the other. A spring 93 normally pulls the lever 91 in a clockwise direction and holds it at the extreme rightward limit of its motion, where the left hand end of a slot 94 in the lever engages a stud 95 screwed through the slot and into the casing. The arm 91 can move counterclockwise or leftwardly against the influence of the spring 93 to a limited extent until the left hand edge of the arm comes into contact with a stop member 96 in the form of a lug or plate securely fastened to the casing 31.

As the gear segment 72 is swung leftwardly or in a counterclockwise direction by actuation of the lever 70, the adjustable abutment screw 76 comes into contact with the ear 90 on the lever 91 and thus moves the lever slightly leftwardly until it, in turn, comes into contact with the stop plate 96, when further motion of the parts is arrested. This determines the extreme limit of motion of the operating lever 70 and gear segment 72.

When the lever 91 is turned slightly as above described, a slight counterclockwise rotation of the shaft 92 is thereby produced, which moves an arm 98 (Figs. 3, 6, and 8) fixed to the opposite end of the shaft 92, which arm 98 presses upon and moves an arm 99 of a two armed lever pivoted at 100 to the casing. The other arm 101 of this lever, normally pulled downwardly by a spring 102, has an end which, when it is elevated, constitutes a pawl engaging teeth 103 of a ratchet fixed to the shaft of the feed roller 40, thus stopping the rotation of the feed roller and preventing it from continuing to rotate by momentum after the feeding lever 70 has reached the limit of its motion.

Thus it is seen that the feeding lever 70, at the end of its stroke, operates stop mechanism for stopping the rotation of the feed rollers so that the sensitized sheet material is fed accurately through the same distance each time that the lever 70 is operated.

The documents or other material to be photographed are held in any suitable manner, as for example, by a copyholder of the form indicated in Fig. 1. This copyholder comprises a body or base 110 mounted on the right hand end of the base 30 of the machine, and a member 112 hinged to the portion 110 carries a transparent plate adapted to be raised up to allow a document to be inserted between the members 110 and 112, and to be turned down onto the top of the document to hold it smoothly against the member 110.

Suitable illuminating means may be provided, such as incandescent bulbs 140 held in housings 141 carried by brackets 142 secured at 143 to the parts 110 and 30.

Reflecting means 150 may be carried by the hinged part 112 of the copyholder, if desired.

Means may be provided for operating the shutter of the camera by the movements of the copyholder. For example, the hinged part 112 of the copyholder has one end of a spring 155 secured thereto, the other end of the spring being fastened to a cord or cable 156 passing through a guide 157 and around a pulley 158 secured to a shaft to which a flap shutter, or the like, is attached. When the copyholder part 112 moves upwardly, the shutter closes, and when the copyholder part 112 is moved downwardly into effective position to hold the document, this automatically opens the shutter.

The construction of the copyholder and the connection of the copyholder to the shutter are described in greater detail in my aforesaid parent application, of which this case is a division, and are claimed in that parent application, forming no part of the subject matter claimed in this present divisional application.

In operation, the operator places the document or other matter to be photographed on the copyholder part 110, and pulls down the hinged part 112 so as to overlie the document and hold it flat. The movement of the member 112, in the illustrative embodiment here shown, opens the camera shutter and makes an exposure.

At the end of the desired exposure interval, the shutter is closed, the copyholder part 112 is raised to release the photographed document, and the operator grasps the feeding lever 70, giving it a single rightward pull. This movement, through the gear segment 72, rotates the feed rollers 40 and 41 through the necessary extent to feed the exposed part of the sensitized material out of the focal plane of the camera and to bring a fresh unexposed area of sensitized material into the focal plane. No matter how violently he may operate this feeding lever he does not produce excess feeding of the sheet material because at the end of the stroke of the feeding lever the stop pawl 101 comes into contact with the teeth of the ratchet 103 and stops further rotation of the feed rollers. Thus the operator need have no experience in feeding or winding sheet material in photographic apparatus, for it is necessary only for him to learn to give the feeding lever 70 a complete stroke in one direction to the limit of its motion, after each exposure. The spring 73 automatically returns the feeding lever to initial position ready for the next feeding operation.

If it is desired to cut the strip of sensitized material after each feeding operation, this can be done by operating the lever 61, though preferably the strip is not cut but is rewound on the spool 47, as above mentioned, until the photographing of all the documents that it is desired to photograph at that time has been completed. Then the knife may be operated by depressing the lever 61, and the spool 47 on which the exposed material is wound can be removed from the machine through the door 52, after releasing the spool by pulling outwardly on the trunnion knob 51. The sensitized material can then be developed and fixed in any desired manner. The advance end of the unexposed strip of material, which remains in the camera after the strip has been cut by the severing knife, can then be pulled downwardly and connected to a fresh rewinding reel in known manner, thus making the machine ready for continued operation.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A photographic copying machine comprising a camera, means for holding a strip of sensitized sheet material in position to be exposed within said camera, a feed roller engaging said sensitized material for feeding it, an operating member, means connecting said operating member to said feed roller, a toothed member operatively connected to said feed roller, a pawl for engaging said toothed member, and means operated by said operating member when it reaches a predetermined position for moving said pawl into engagement with said toothed member to stop rotation of said feed roller.

2. A photographic copying machine of the type including a camera, means for holding a strip of sensitized sheet material in position to be exposed within said camera, and a pair of feed rollers engaging opposite sides of said sensitized material for feeding it, characterized by an operating member, means including step-up gearing for connecting said operating member to one of said feed rollers, stop means for limiting movement of said operating member in one direction, and detent means separate from said stop means but operated by said stop means for preventing overthrow of one of said feed rollers.

3. A photographic copying machine of the type including a camera, means for holding a strip of sensitized sheet material in position to be exposed within said camera, and a pair of feed rollers engaging opposite sides of said sensitized material for feeding it, characterized by an operating member including a gear segment, a pinion operatively connected to one of said rollers and meshing with said gear segment, a stop member movable through a limited range of movement, means on said operating member for engaging said stop member to move said stop member through said limited range and to limit movement of said operating member, and arresting means operated by said movement of said stop member for arresting movement of said feed rollers.

4. A photographic copying machine of the type including a camera, means for holding a strip of sensitized sheet material in position to be exposed within said camera, and a pair of feed rollers engaging opposite sides of said sensitized material for feeding it, characterized by an operating member including a gear segment, a pinion operatively connected to one of said rollers and meshing with said gear segment, a stop member movable through a limited range of movement, means on said operating member for engaging said stop member to move said stop member through said limited range and to limit movement of said operating member, a toothed member operatively connected to one of said rollers, a pawl movable into and out of engagement with said toothed member, and means operated by said movement of said stop member for moving said pawl into engagement with said toothed member to arrest movement of said feed rollers.

5. A photographic copying machine of the type including a camera, means for holding a strip of sensitized sheet material in position to be exposed within said camera, a pair of feed rollers engaging opposite sides of said sensitized material for feeding it, and a copyholder for holding material to be photographed by said camera, characterized by a pinion operatively connected to one of said feed rollers, a gear segment meshing with said pinion and effective upon a single movement through a minor part of a revolution to rotate said feed roller a plurality of times sufficient to remove an exposed portion of said sensitized material from the focal plane and to bring a fresh unexposed portion thereof into the focal plane, and means for moving said gear segment, said means comprising an operating arm movable in a generally horizontal direction substantially toward and away from an operator stationed at said copyholder and within reach of him so that feeding of said sensitized material may be readily accomplished by such an operator without leaving his position at said copyholder.

6. A photographic copying machine of the type including a camera, means for holding a strip of sensitized sheet material in position to be exposed within said camera, and a pair of feed rollers engaging opposite sides of said sensitized material for feeding it, characterized by an operating member, means connecting said operating member to one of said feed rollers, adjustable stop means for limiting movement of said operating member in one direction, and separate stop means for preventing overthrow of one of said feed rollers.

7. A photographic copying machine of the type including a camera, means for holding a strip of sensitized sheet material in position to be exposed within said camera, and a pair of feed rollers engaging opposite sides of said sensitized material for feeding it, characterized by an operating member, means connecting said operating member to one of said feed rollers, movable stop means for limiting movement of said operating member in one direction, movable stop means for preventing overthrow of one of said feed rollers, and means interconnecting said two stop means to each other to operate one of them from the other.

8. A photographic copying machine of the type including a camera, means for holding a strip of sensitized sheet material in position to be exposed within said camera, and a pair of feed rollers engaging opposite sides of said sensitized material for feeding it, characterized by a gear segment, a handle connected to said gear segment for operating it, a pinion meshing with said gear segment, said pinion being of materially smaller radius than said gear segment so that said pinion may make a number of revolutions upon a single actuation of said gear segment through less than a complete revolution, means including a one-way clutch for connecting said pinion to one of said feed rollers to rotate said one of said feed rollers in one direction upon movement of said gear segment in one direction, and a second one-way clutch operatively connected to said one of said feed rollers to prevent retrograde movement of said one of said feed rollers upon movement of said gear segment in a reverse direction.

PAUL LANDROCK.